United States Patent
Yong et al.

(10) Patent No.: US 11,597,448 B2
(45) Date of Patent: Mar. 7, 2023

(54) VEHICLE BODY

(71) Applicants: Hyundai Motor Company, Seoul (KR); Kia Corporation, Seoul (KR)

(72) Inventors: Ji Ae Yong, Hwaseong-si (KR); Seok Ju Gim, Seongnam-si (KR); Ho Yeon Kim, Daegu (KR); Chul Hee Heo, Hwaseong-si (KR); Tae Gyu Park, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/375,600

(22) Filed: Jul. 14, 2021

(65) Prior Publication Data

US 2022/0185390 A1    Jun. 16, 2022

(30) Foreign Application Priority Data

Dec. 10, 2020 (KR) ........................ 10-2020-0172444

(51) Int. Cl.
| | |
|---|---|
| *B62D 27/02* | (2006.01) |
| *B62D 23/00* | (2006.01) |
| *B62D 27/06* | (2006.01) |
| *B62D 25/20* | (2006.01) |

(52) U.S. Cl.
CPC ......... *B62D 27/023* (2013.01); *B62D 23/005* (2013.01); *B62D 25/20* (2013.01); *B62D 27/065* (2013.01)

(58) Field of Classification Search
CPC .... B62D 27/023; B62D 27/065; B62D 25/20; B62D 23/005

USPC ...... 296/205, 203.01–203.4, 193.06, 29, 209
See application file for complete search history.

(56) References Cited

U.S. PATENT DOCUMENTS

| | | | |
|---|---|---|---|
| 4,986,597 A | | 1/1991 | Clausen |
| 5,209,541 A | * | 5/1993 | Janotik ................. B62D 27/02 29/469 |
| 5,549,352 A | * | 8/1996 | Janotik ................ B62D 29/008 296/205 |
| 6,282,790 B1 | | 9/2001 | Jaekel et al. |
| 6,334,642 B1 | * | 1/2002 | Waldeck ............. B62D 27/065 296/193.03 |
| 6,824,204 B2 | | 11/2004 | Gabbianelli et al. |
| 6,948,768 B2 | | 9/2005 | Corcoran et al. |
| 7,677,646 B2 | | 3/2010 | Nakamura |
| 8,998,216 B2 | | 4/2015 | Maeda et al. |
| 10,800,224 B2 | | 10/2020 | Sellars et al. |
| 2017/0225714 A1 | | 8/2017 | Ito |
| 2019/0299737 A1 | | 10/2019 | Sellars et al. |

FOREIGN PATENT DOCUMENTS

| | | | | |
|---|---|---|---|---|
| CN | 107054039 B | * | 6/2019 | ............. B60G 11/15 |
| KR | 19980070976 A | | 10/1998 | |
| WO | WO-2005066012 A1 | * | 7/2005 | ........... B61D 17/043 |

\* cited by examiner

*Primary Examiner* — Dennis H Pedder
(74) *Attorney, Agent, or Firm* — Slater Matsil, LLP

(57) ABSTRACT

An embodiment vehicle body includes a first member extending in a shape having an internal space, the first member having an open side, and a second member coupled to the first member, the second member having an end with a closed surface, wherein the end with the closed surface is received in the internal space of the first member through the open side of the first member, and the closed surface and at least one side wall of the second member are in surface contact with the first member.

20 Claims, 4 Drawing Sheets

VEHICLE BODY

CROSS-REFERENCE TO RELATED APPLICATIONS

This application claims the benefit of Korean Patent Application No. 10-2020-0172444, filed on Dec. 10, 2020, which application is hereby incorporated herein by reference.

TECHNICAL FIELD

The present invention relates to a vehicle body.

BACKGROUND

A vehicle body must be designed so as to accommodate therein a variety of internal devices of a vehicle and be able to effectively absorb collision impact to protect vehicle occupants when impact is applied to the vehicle.

Existing vehicles require a space in which an engine or a battery is provided and spaces in which wheels, suspensions, steering units, and the like for driving the vehicle are provided. Since a wheel housing on which each of the wheels is mounted, as well as a suspension provided on each wheel, a steering unit connecting corresponding wheels, a drive unit transmitting driving power, and the like, occupy significant spaces in the vehicle body, the vehicle body must be designed in consideration of such components in order to absorb impact applied to the vehicle. In addition, when the number of devices to be considered is increased, fabrication and assembly processes of the vehicle body are more complicated and more time consuming.

However, recently, in-wheel systems in which a drive unit, a steering unit, a speed reducer, and the like are internally mounted on each wheel of a vehicle have been developed. In such an in-wheel system, the vehicle body must be designed differently from existing vehicle bodies, since it is not required to connect the suspension, the steering unit, and the drive unit to each wheel. Thus, when the in-wheel system is used in a vehicle, a vehicle body having wheel housing spaces, able to obtain a sufficient level of strength, and able to further simplify fabrication and assembly processes needs to be developed.

The foregoing is intended merely to aid in the understanding of the background of the present invention, and is not intended to mean that the present invention falls within the purview of the related art that is already known to those skilled in the art.

SUMMARY

The present invention relates to a vehicle body. Particular embodiments relate to a vehicle body of a vehicle having an in-wheel platform, the vehicle body having a structure by which vehicle body members are coupled. The vehicle body according to embodiments of the present invention may obtain collision strength between open-side members, maintain coupling strength between the members, and simplify an assembly process.

Embodiments of the present invention consider problems occurring in the related art, and embodiments of the present invention provide a vehicle body of a vehicle having an in-wheel platform, the vehicle body having a structure by which respective vehicle members are coupled thereto. In the vehicle body, open-side members are coupled using flanges and closed surfaces formed thereon. Thus, the vehicle body may obtain collision strength between open-side members, maintain coupling strength between the members, and simplify an assembly process.

According to one embodiment of the present invention, a vehicle body includes a first member extending in a shape having an internal space, with one side thereof being open, and a second member having a closed surface on one end thereof and coupled to the first member, the one end having the closed surface being received in the internal space of the first member through the open side of the first member. The second member may be coupled to the first member, in which the closed surface on the one end and one or more side walls of the second member are in surface contact with the first member.

The first member may include a flange unit provided on one side thereof. The flange unit may include upper flanges and lower flanges spaced apart from each other in a top-bottom direction with respect to the open side of the first member. The second member may be coupled to the first member while being inserted between corresponding flanges of the flange unit.

The plurality of flanges of the flange unit may extend in a longitudinal direction of the second member and cover and support top and bottom surfaces of the second member.

The closed surface of the one end of the second member may be coupled to an inner surface of a side wall of the first member. One or more side surfaces of the second member adjacent to the closed surface may be in surface contact with one or more flanges of the flange unit.

The second member may extend in a shape having an internal space, with one side thereof being open and a portion of one side wall thereof extending or being bent to cover a portion of the open side, thereby forming the closed surface on the one end.

The extending or bent portion of the one side wall of the second member may be inserted into the internal space of the first member, thereby being coupled to, while being in surface contact with, an inner surface of a side wall of the first member.

The vehicle body may further include a plurality of shock absorber housings covering and supporting top ends of shock absorbers connected to vehicle wheels and disposed in right and left portions of a vehicle. One end of the first member may be coupled to a bottom portion of a corresponding one of the shock absorber housings. The first member may extend downward and be bent so as to connect corresponding shock absorber housings among the plurality of shock absorber housings in a transverse direction of the vehicle.

The first members may be provided in front and rear portions of the vehicle. The second members may be located below the shock absorber housings, and ends of the second members may be coupled to the first members provided in the front and rear portions of the vehicle.

The vehicle body may further include a plurality of shock absorber housings covering and supporting top ends of shock absorbers connected to vehicle wheels and disposed in front and rear portions of a vehicle. One end of the first member may be coupled to a bottom portion of a corresponding one of the shock absorber housings, and the first member may extend downward and be bent so as to connect corresponding shock absorber housings among the plurality of shock absorber housings in a longitudinal direction of the vehicle.

The first members may be provided in right and left portions of the vehicle. The second members may be located below the shock absorber housings and ends of the second members are coupled to the first members provided in the right and left portions of the vehicle.

The first members and the second members may be coupled by bolting the first members and the second members at a plurality of points.

The first members and the second members may be coupled by bolting the first members and the second members at ends of the second members or the flange units.

According to embodiments of the present invention, the vehicle body used for a vehicle having an in-wheel platform has a structure by which respective vehicle members are coupled thereto. In the vehicle body, open-side members are coupled using flanges and closed surfaces formed thereon. Thus, the vehicle body may obtain collision strength between open-side members, maintain coupling strength between the members, and simplify an assembly process.

BRIEF DESCRIPTION OF THE DRAWINGS

The above and other objectives, features, and other advantages of embodiments of the present invention will be more clearly understood from the following detailed description when taken in conjunction with the accompanying drawings, in which.

DETAILED DESCRIPTION OF ILLUSTRATIVE EMBODIMENTS

Figure 1:
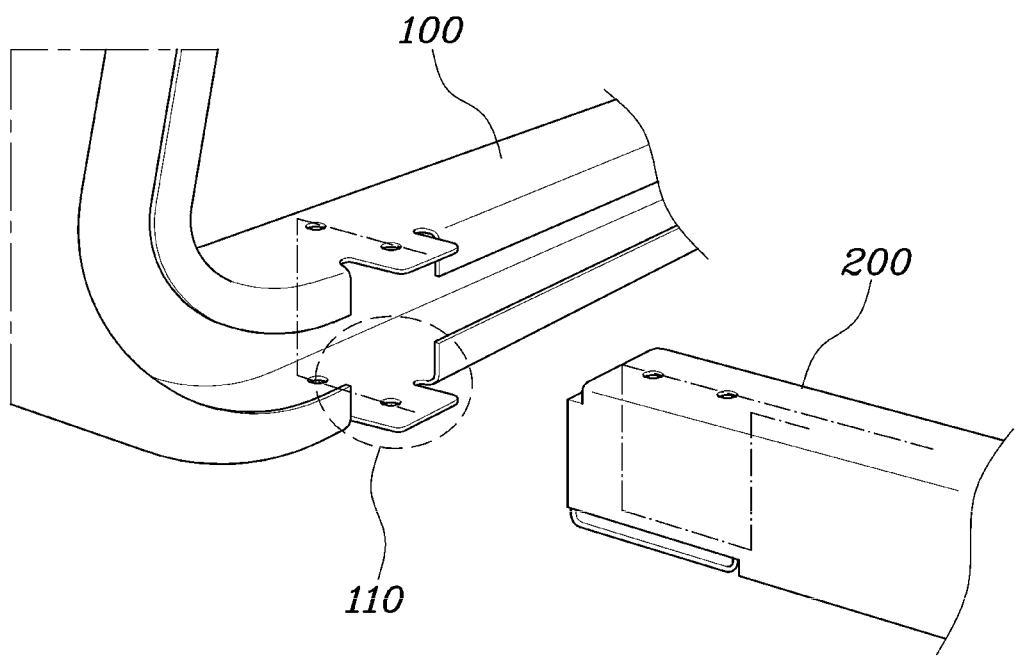
FIG. 1 is a view illustrating a first member and a second member in a vehicle body according to an embodiment of the present invention.
Figure 2:
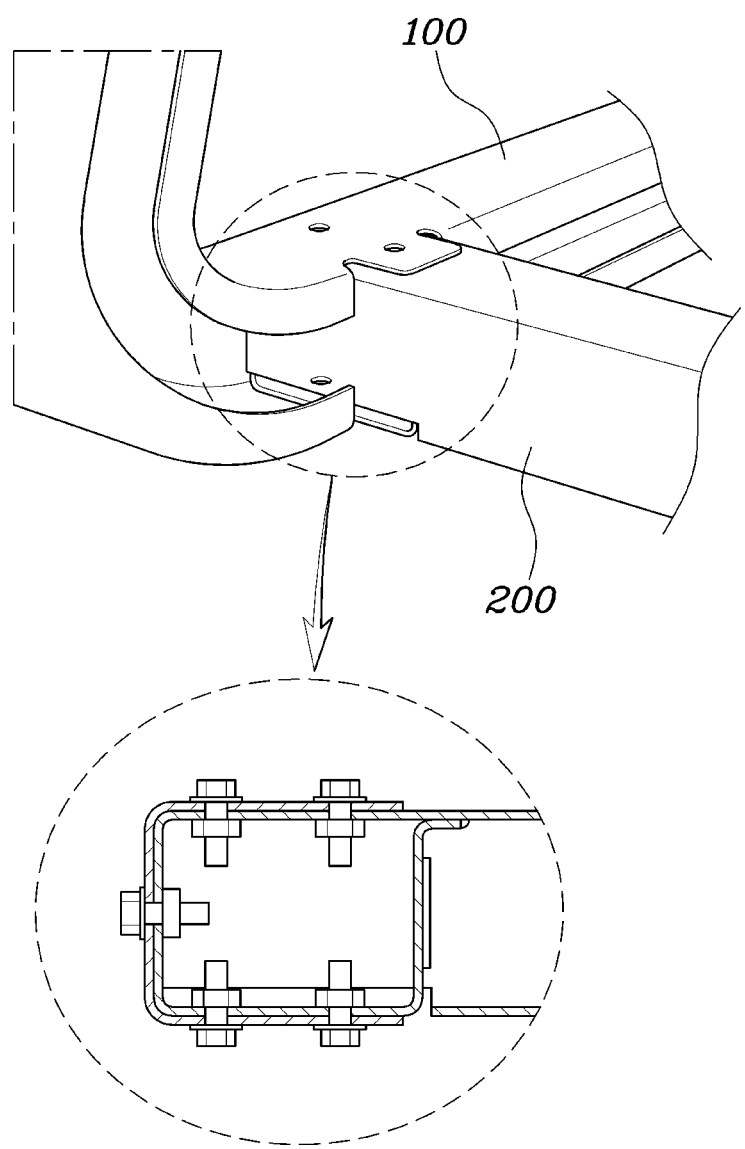
FIG. 2 is a view illustrating the first member and the second member coupled to each other in the vehicle body according to an embodiment of the present invention.
Figure 3:
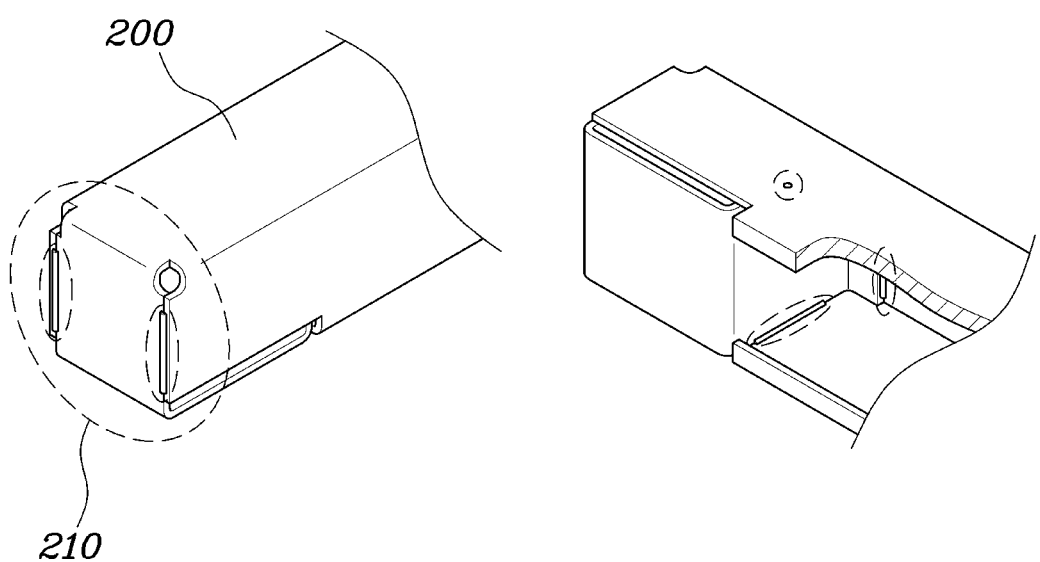
FIG. 3 is a view illustrating the second member in the vehicle body according to an embodiment of the present invention, in which one side portion of the second member extends and is bent to cover a portion of an open side thereof, thereby forming a closed surface on one end thereof.
Figure 4:
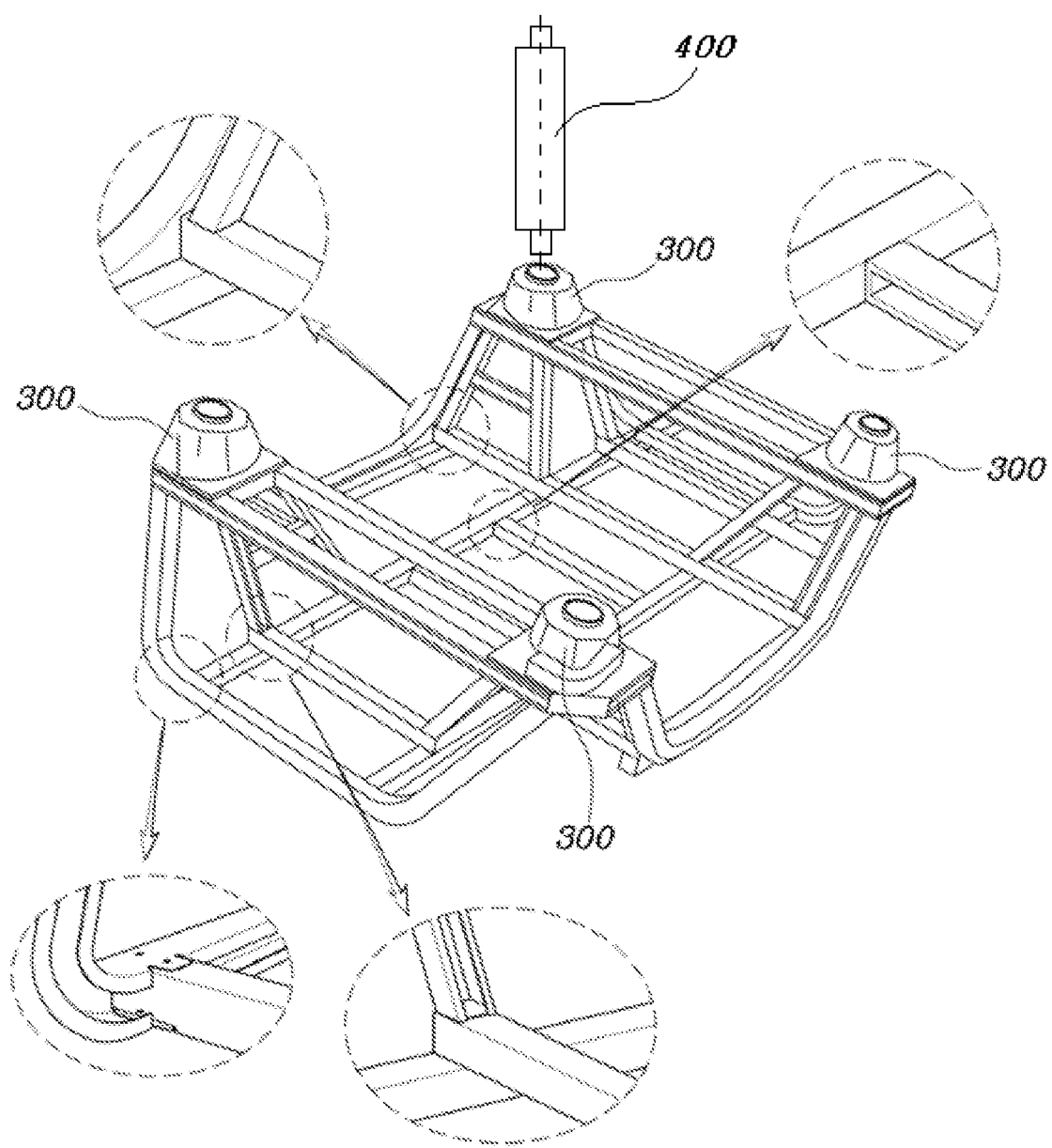
FIG. 4 is a view illustrating a plurality of shock absorber housings connected via the first members and the second members in the vehicle body according to an embodiment of the present invention.

FIG. 1 is a view illustrating a first member and a second member in a vehicle body according to an embodiment of the present invention, FIG. 2 is a view illustrating the first member and the second member coupled to each other in the vehicle body according to an embodiment of the present invention, FIG. 3 is a view illustrating the second member in the vehicle body according to an embodiment of the present invention, in which one side portion of the second member extends and is bent to cover a portion of an open side thereof, thereby forming a closed surface on one end thereof, and FIG. 4 is a view illustrating a plurality of shock absorber housings connected via the first members and the second members in the vehicle body according to an embodiment of the present invention.

FIG. 1 is a view illustrating the first member and the second member in the vehicle body according to an embodiment of the present invention. FIG. 2 is a view illustrating the first member and the second member coupled to each other in the vehicle body according to an embodiment of the present invention. The vehicle body according to an embodiment of the present invention includes a first member 100 and a second member 200. The first member 100 extends in a shape having an internal space, with one side thereof being open. The second member 200 has a closed surface on one end thereof. The second member 200 is coupled to the first member 100, the one end having the closed surface being received in the internal space of the first member 100 through the open side of the first member 100. The second member 200 is coupled to the first member 100, in which the closed surface on one end and one or more side walls of the second member 200 are in surface contact with the first member 100.

The vehicle body according to an embodiment of the present invention is provided for a vehicle using an in-wheel system different from existing vehicles, in which it is not required to connect a drive shaft, a steering unit, or the like between wheels. Thus, a shock absorber 400 (shown in FIG. 4) and a shock absorber housing 300 are provided on top of each of vehicle wheels. The first member 100 or the second member 200 may be coupled to the corresponding shock absorber housing 300 to connect corresponding vehicle body members or be coupled to the corresponding vehicle body members so as to maintain collision strength and assembly strength, thereby providing the vehicle body of an in-wheel system vehicle.

In addition, in the vehicle body according to an embodiment of the present invention, the first member 100 includes a flange unit no provided on one side thereof. The flange unit no includes upper flanges and lower flanges spaced apart from each other in the top-bottom direction with respect to the open side of the first member 100. The second member 200 may be coupled to the first member 100 while being inserted between corresponding flanges of the flange unit no.

Specifically, in the vehicle body according to an embodiment of the present invention, the flange unit no is configured such that the plurality of flanges extends in the longitudinal direction of the second member 200 (i.e. the transverse direction of the first member 100 in FIGS. 1 and 2). The plurality of flanges may cover and support the top and bottom surfaces of the second member 200. In addition, in the vehicle body according to an embodiment of the present invention, the second member 200 may be coupled to the first member 100, with the closed surface on one end thereof being coupled to an inner surface of the side wall of the first member 100, and one or more side wall portions of the second member 200 being in surface contact with one or more flanges of the flange unit no of the first member 100.

As the plurality of flanges extends in the longitudinal direction of the second member 200, the flange unit no of the first member 100 has the shape of a "C" so as to surround (or hold) one end of the second member 200 fitted to the first member 100. Since the first member 100 is coupled to the second member 200 by surface contact with not only the closed surface of the second member 200 but also the top and bottom surfaces of the second member 200, sufficient levels of assembly strength and collision strength may be obtained by the coupling between the first member 100 and the second member 200. In addition, since the flange unit no is provided, when the first member 100 and the second member 200 are coupled to each other, the flange unit no may serve to provide sufficient areas to be coupled with the top and bottom surfaces of the second member 200.

FIG. 3 is a view illustrating the second member in the vehicle body according to an embodiment of the present invention, in which one side portion of the second member extends and is bent to cover a portion of an open side thereof, thereby forming a closed surface on one end thereof. In the vehicle body according to an embodiment of the present invention, the second member 200 extends in a shape having an internal space, with one side thereof being open. A portion of one side wall extends or is bent to cover portions of the open side, thereby forming the closed surface on one end 210.

Specifically, both the first member wo and the second member 200 may have a shape having the internal space, with one side thereof being open. This open-side structure has an advantage in that, even in a situation in which it is difficult to couple the members, a tool may be introduced through the open side of each member so as to easily and simply couple the members. However, the open-side member may have lower impact strength or lower assembly strength than a closed-side member without an open side. One side wall of the second member 200 extends or is bent to cover a portion of the open side, thereby forming the closed surface on the end. When the second member 200 is coupled to the first member wo, not only the closed surface on the end 210 of the second member 200, but also a plurality of portions, such as the top surface and the bottom surface, of the second member 200 may be coupled to the first member 100, thereby increasing collision strength and assembly strength.

Here, the side wall of the end of the second member 200 extends and is bent 90° so as to cover a portion of the open side thereof, and the remaining portion of the side wall of the end is in contact with the inner surface of the side wall of the internal space of the second member 200. The extension may be provided on both sides of the closed surface of the end of the second member 200 or a portion in contact with the inner surface of the side wall of the internal space by carbon dioxide ($CO_2$) welding.

In addition, in the vehicle body according to an embodiment of the present invention, the extending or bent portion of the side wall of the second member 200 may be inserted into the internal space of the first member wo and be coupled to, while being in surface contact with, the inner surface of the side wall of the first member 100. Since the extension of the side wall of the second member 200 is bent, the open end of the second member 200 has a closed quadrangular or square structure. In addition, the closed surface of the end 210 and the top and bottom surfaces of the second member 200 are coupled to, while being in surface contact with, the flange unit no of the first member 100. Accordingly, assembly strength and collision strength between the members may be obtained, and the assembly process may be simplified.

FIG. 4 is a view illustrating a plurality of shock absorber housings connected via the first members and the second members in the vehicle body according to an embodiment of the present invention. The vehicle body according to an embodiment of the present invention further includes a plurality of shock absorber housings 300 covering and supporting the top ends of shock absorbers 400 connected to vehicle wheels. The plurality of shock absorber housings 300 may be disposed in the right and left portions of the vehicle. Ends of the first members 100 may be coupled to the bottom portions of the shock absorber housings 300, and the first members 100 may extend downward and be bent so as to connect the plurality of shock absorber housings 300 in the transverse direction of the vehicle. In addition, the first members 100 may be provided in the front and rear portions of the vehicle, and the ends 210 of the second members 200 located below the shock absorber housings 300 may be connected to the first members 100 located in the front and rear portions of the vehicle.

Specifically, the first members 100 may connect the shock absorber housings 300 in the transverse direction of the vehicle, thereby increasing the strength of the vehicle against front and rear collision and distributing impact across the shock absorber housings 300 and other vehicle members. In the same manner, the second members 200 may connect the first members 100, thereby increasing collision strength of the shock absorber housings 300 and the first members 100 and distributing impact across the respective vehicle members.

In addition, the vehicle body according to an embodiment of the present invention may further include the plurality of shock absorber housings 300 covering and supporting the top ends of the shock absorbers 400 connected to the vehicle wheels. The plurality of shock absorber housings 300 may be disposed in the front and rear portions of the vehicle. The first members 100 may have ends coupled to the bottom portions of the shock absorber housings 300 and extend downward and be bent so as to connect the plurality of shock absorber housings 300 in the longitudinal direction of the vehicle. In addition, the first members 100 may be provided in the right and left portions of the vehicle, and the ends 210 of the second members 200 located below the shock absorber housings 300 may be connected to the first members 100 located in the right and left portions of the vehicle.

Specifically, the first members 100 may connect the shock absorber housings 300 in the longitudinal direction of the vehicle, thereby increasing the strength of the vehicle against side collision and distributing impact across the shock absorber housings 300 and other vehicle members. In the same manner, the second members 200 may connect the first members 100, thereby increasing collision strength of the shock absorber housings 300 and the first members 100 and distributing impact across the respective vehicle members.

In addition, the first members 100 are not limited to members connecting the plurality of shock absorber housings 300. Rather, the first members 100 may form a plurality of coupling points using the plurality of flange units no when coupled to the other vehicle members, the other first members 100, or the second members 200, thereby obtaining collision strength and assembly strength. In addition, since the first members 100 have the side-open structure with one side thereof being open, when a first member 100 is coupled to an outer surface of another first member 100, the first member 100 may allow a tool to be introduced into the internal space thereof through the open side so that the first member 100 is coupled to another vehicle member in a simple manner while being in surface contact with the other vehicle member.

In addition, in the vehicle body according to an embodiment of the present invention, the first members 100 and the second members 200 may be coupled to each other by bolting the first members 100 and the second members 200 at a plurality of points. In addition, the first members 100 and the second members 200 may be coupled to each other by bolting the first members 100 and the second members 200 at ends 210 of the second members 200 or the flange units 110.

As described above, when the members are coupled, the surface contact may be established through the flange units 110 of the first members 100 and the ends 210 of the second members 200 in order to obtain impact strength and assembly strength. At the same time, the members may be connected at the plurality of points in which the surface contact is established in a simple manner, such as bolting. Thus, the vehicle body may be simply and rapidly assembled by humans or robots without large facilities or a complicated process.

Although the preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A vehicle body comprising:
a plurality of first members each extending in a shape having an internal space, each of the first members having an open side;
a plurality of second members, each coupled to at least one of the plurality of first members, each of the second members having an end with a closed surface, wherein the end with the closed surface of one of the second members is received in the internal space of one of the first members through the open side of the first member, and the closed surface and at least one side wall of the second member are in surface contact with the first member, wherein the first member comprises a flange unit, the flange unit comprising a plurality of flanges including upper flanges and lower flanges spaced apart from each other in a top-bottom direction with respect to the open side of the first member, wherein the second member is inserted into the internal space of the first member between corresponding upper and lower flanges of the flange unit; and
a plurality of shock absorber housings covering and supporting top ends of shock absorbers configured to be connected to vehicle wheels, wherein the shock absorber housings are disposed in right and left portions of the vehicle body, an end of each of the first members is coupled to a bottom portion of a corresponding one of the shock absorber housings, and each of the first members extends downward and is bent to connect corresponding shock absorber housings among the plurality of shock absorber housings in a transverse direction of the vehicle body.

2. The vehicle body of claim 1, wherein the upper flanges and the lower flanges of the flange unit extend in a longitudinal direction of the second member and cover and support top and bottom surfaces of the second member, respectively.

3. The vehicle body of claim 1, wherein the closed surface of the second member is coupled to an inner surface of a side wall of the first member, and at least one side surface of the second member adjacent to the closed surface is in surface contact with at least one flange of the plurality of flanges of the flange unit.

4. The vehicle body of claim 1, wherein the first member and the second member are coupled with a bolt at the end of the second member with the closed surface or at the flange unit.

5. A vehicle body comprising:
a plurality of first members each extending in a shape having an internal space, each of the first members having an open side;
a plurality of second members, each coupled to at least one of the plurality of first members, each of the second members having an end with a closed surface, wherein the end with the closed surface of one of the second members is received in the internal space of one of the first members through the open side of the first member, and the closed surface and at least one side wall of the second member are in surface contact with the first member; and a plurality of shock absorber housings covering and supporting top ends of shock absorbers configured to be connected to vehicle wheels, wherein the shock absorber housings are disposed in right and left portions of the vehicle body, an end of each of the first members is coupled to a bottom portion of a corresponding one of the shock absorber housings, and each of the first members extends downward and is bent to connect corresponding shock absorber housings among the plurality of shock absorber housings in a transverse direction of the vehicle body.

6. The vehicle body of claim 5, wherein the second member extends in a shape having an internal space, one side of the second member is open, and a portion of one side wall of the second member extends or is bent to cover a portion of the open side to provide the closed surface.

7. The vehicle body of claim 6, wherein the portion of the one side wall of the second member is inserted into the internal space of the first member and is coupled to, and in surface contact with, an inner surface of a side wall of the first member.

8. The vehicle body of claim 1, wherein the first members and the second members are coupled by bolts at a plurality of points.

9. The vehicle body of claim 5, wherein the first members are provided in front and rear portions of the vehicle body, the second members are located below the shock absorber housings, and ends of the second members are coupled to the first members provided in the front and rear portions of the vehicle body.

10. The vehicle body of claim 5, wherein the shock absorber housings are disposed in front and rear portions of the vehicle body, an end of each of the first members is coupled to a bottom portion of a corresponding one of the shock absorber housings, and each of the first members extends downward and is bent to connect corresponding shock absorber housings among the plurality of shock absorber housings in a longitudinal direction of the vehicle body.

11. The vehicle body of claim 10, wherein the first members are provided in right and left portions of the vehicle body, the second members are located below the shock absorber housings, and ends of the second members are coupled to the first members provided in the right and left portions of the vehicle body.

12. The vehicle body of claim 5, wherein the first members and the second members are coupled by bolts at a plurality of points.

13. A vehicle body comprising:
a plurality of first members each extending in a shape having an internal space, each of the first members having an open side;
a plurality of second members, each coupled to at least one of the plurality of first members, each of the second members having an end with a closed surface, wherein the end with the closed surface of one of the second members is received in the internal space of one of the first members through the open side of the first member, and the closed surface and at least one side wall of the second member are in surface contact with the first member; and
a plurality of shock absorber housings covering and supporting top ends of shock absorbers configured to be connected to vehicle wheels, wherein the shock absorber housings are disposed in front and rear portions of the vehicle body, an end of each of the first members is coupled to a bottom portion of a corresponding one of the shock absorber housings, and each of the first members extends downward and is bent to connect corresponding shock absorber housings among the plurality of shock absorber housings in a longitudinal direction of the vehicle body.

14. The vehicle body of claim 13, wherein the first members and the second members are coupled by bolts at a plurality of points.

15. The vehicle body of claim 13, wherein the first members are provided in front and rear portions of the vehicle body, the second members are located below the shock absorber housings, and ends of the second members are coupled to the first members provided in the front and rear portions of the vehicle body.

16. The vehicle body of claim 13, wherein the first members are provided in right and left portions of the vehicle body, the second members are located below the shock absorber housings, and ends of the second members are coupled to the first members provided in the right and left portions of the vehicle body.

17. The vehicle body of claim 15, wherein the first members and the second members are coupled by bolts at a plurality of points.

18. The vehicle body of claim 16, wherein the first members and the second members are coupled by bolts at a plurality of points.

19. The vehicle body of claim 13, wherein the second member extends in a shape having an internal space, one side of the second member is open, and a portion of one side wall of the second member extends or is bent to cover a portion of the open side to provide the closed surface.

20. The vehicle body of claim 19, wherein the first member and the second member are coupled by bolts at a plurality of points.

* * * * *